US009806347B2

(12) United States Patent
Kim et al.

(10) Patent No.: US 9,806,347 B2
(45) Date of Patent: *Oct. 31, 2017

(54) METHOD OF PREPARING ALLOY CATALYST FOR FUEL CELLS AND ALLOY CATALYST FOR FUEL CELLS PREPARED BY THE SAME

(71) Applicant: KOREA INSTITUTE OF ENERGY RESEARCH, Daejeon (KR)

(72) Inventors: Hee-yeon Kim, Daejeon (KR); Seok-yong Hong, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 432 days.

This patent is subject to a terminal disclaimer.

(21) Appl. No.: 14/263,288

(22) Filed: Apr. 28, 2014

(65) Prior Publication Data

US 2014/0329671 A1   Nov. 6, 2014

(30) Foreign Application Priority Data

May 2, 2013   (KR) .................. 10-2013-0049402

(51) Int. Cl.
    *B01J 23/40*    (2006.01)
    *B01J 23/42*    (2006.01)
    (Continued)

(52) U.S. Cl.
CPC ....... *H01M 4/9041* (2013.01); *H01M 4/8867* (2013.01); *H01M 4/921* (2013.01); *H01M 4/926* (2013.01)

(58) Field of Classification Search
CPC .... H01M 4/9041; H01M 4/926; H01M 4/921; H01M 4/8867; Y02E 60/50
(Continued)

(56) References Cited

U.S. PATENT DOCUMENTS 7,648,942 B2 * 1/2010 Thollon ................. C23C 16/18
                                                                   427/125
2011/0177938 A1 * 7/2011 Scheab ................. B01J 37/0242
                                                                   502/185

FOREIGN PATENT DOCUMENTS

JP        11-250918 A    9/1999
JP     2003024798 A    1/2003
(Continued)

OTHER PUBLICATIONS

European Search Report for corresponding European Patent Application No. 14166467.2, filed Apr. 29, 2014, dated Oct. 6, 2014.
(Continued)

*Primary Examiner* — Haytham Soliman
(74) *Attorney, Agent, or Firm* — Westman, Champlin & Koehler, P.A.; Amanda M. Prose

(57) ABSTRACT

Disclosed herein is a method of preparing an alloy catalyst for fuel cells, which is suitable for mass production and can reduce manufacturing costs. The method includes vaporizing at least two catalyst precursors in separate vaporizers; supplying the at least two vaporized catalyst precursors to a reactor while preventing contact therebetween; and synthesizing an alloy catalyst in the reactor. The method can prepare an alloy catalyst through a one-step process unlike typical multi-step methods for preparing catalysts, and can prepare an alloy catalyst at a much lower temperature than the typical methods for preparing alloys, thereby enabling mass production and cost reduction.

8 Claims, 2 Drawing Sheets

(51) Int. Cl.
   *H01M 4/90* (2006.01)
   *H01M 4/88* (2006.01)
   *H01M 4/92* (2006.01)

(58) Field of Classification Search
   USPC .................................................. 502/325
   See application file for complete search history.

(56) References Cited

FOREIGN PATENT DOCUMENTS

| | | |
|---|---|---|
| JP | 2005270687 A | 10/2005 |
| JP | 2008525635 A | 7/2008 |
| JP | 2009120916 A | 6/2009 |
| KR | 1020020032935 A | 5/2002 |
| KR | 10-0823502 B1 | 4/2008 |
| KR | 1020110045087 A | 5/2011 |
| KR | 1020120054254 A | 5/2012 |
| KR | 101334057 B1 | 11/2013 |
| WO | 2004022209 A2 | 3/2004 |

OTHER PUBLICATIONS

Lu S-Y et al: "Pd—Ag alloy filmes prepared by metallorganic chemical vapor deposition process", Thin Solid Films, Elsevier-Sequoia S.A. Lausanne, CH, vol. 376, No. 1-2, Nov. 1, 2000, pp. 67-72.
C.J. Smart, S.K. Reynolds, C.L. Stanis: "Chemical vapor deposition of copper alloys", Materials Research Society Symp. Proc., vol. 282, 1993, pp. 229-237.
Japanese Office Action for corresponding Japanese Patent Application No. 2014-094042, filed Apr. 30, 2014, dated Mar. 17, 2015.
Korean Office Action for corresponding Korean Patent Application No. 10-2013-0049402, filed May 2, 2013, dated Nov. 11, 2014.
Japanese Office Action for corresponding Japanese Patent Application No. 2014-094042, filed Apr. 30, 2014, dated Aug. 25, 2015.

\* cited by examiner

METHOD OF PREPARING ALLOY CATALYST FOR FUEL CELLS AND ALLOY CATALYST FOR FUEL CELLS PREPARED BY THE SAME

CROSS-REFERENCE TO RELATED APPLICATION(S)

This application claims priority to Korean Patent Application No. 10-2013-0049402, filed on May 2, 2013, the disclosure of which is incorporated by reference in its entirety.

BACKGROUND

1. Technical Field

The present invention relates to a method of preparing alloy particles used as a catalyst for fuel cells, and more particularly, to a method of preparing nano-scale alloy catalyst particles by a simple single process.

2. Description of the Related Art

Until recently, despite several decades of research into fuel cells, it has been difficult to commercialize fuel cells. The main reasons for this difficulty are high cost for a platinum catalyst used as an electrode for fuel cells and deterioration in durability of the catalyst due to corrosion and detachment of the catalyst in the course of cell reactions. In order to resolve these problems, research into improving performance and durability of catalysts for fuel cells have been carried out in various ways. Namely, various studies have been made to attach a specific functional group (nitrogen and the like) to a carbon support for a platinum catalyst, to form an alloy of platinum particles with other metals, and the like. However, no satisfactory results have been provided yet in the art.

Currently, platinum has proven to exhibit the best performance as an electrode catalyst for fuel cells. Based on the platinum catalyst, many studies are focused on addition of various secondary metals to the platinum catalyst. Namely, in order to decrease poisoning of catalysts due to minor amounts of carbon monoxide (CO) residing in a fuel for an anode (anode), studies have been made to add ruthenium (Ru), tin (Sn), molybdenum (Mo) and the like to the platinum catalyst. In a cathode, oxygen reduction reaction (ORR) occurs very slowly as compared with hydrogen oxidation reaction, which is a main cause of decrease in fuel cell performance.

Therefore, in order to increase the rate of ORR, various studies have been made to develop alloy catalysts, such as Pt—Co, Pt—Cu, Pt—Co—Cu, Pt—Pd, and the like, which are formed by combining the platinum catalyst with cobalt (Co), copper (Co) or palladium (Pd) and the like. Further, there has been a study for synthesizing such metals in a core-shell structure.

However, according to the results of these studies, various metals must be sequentially supported and intermediate treatment must be included in each procedure (Korean Registered Patent No. 10-823502). For example, when a catalyst is prepared by an incipient-wetness impregnation method, the method includes drying, firing, and the like. When a catalyst is prepared by a template method, the method includes separately manufacturing a template, strong-acidic treatment to dissolve the template, and the like, which are complicated and hazardous processes.

[Patent Document] Korean Patent No. 10-823502

BRIEF SUMMARY

The present invention has been conceived to solve such problems in the related art, and an object of the present invention is to provide a method of preparing an alloy catalyst for fuel cells, which is suitable for mass production and can reduce production costs.

In accordance with one aspect of the present invention, a method of preparing an alloy catalyst for fuel cell includes: vaporizing at least two catalyst precursors in separate vaporizers; supplying the at least two vaporized catalyst precursors to a reactor while preventing contact therebetween; and synthesizing an alloy catalyst in the reactor.

In accordance with another aspect of the present invention, a method of preparing a platinum alloy catalyst for fuel cells includes: vaporizing a platinum (Pt) catalyst precursor and a co-catalyst precursor in separate vaporizers; supplying the vaporized platinum (Pt) catalyst precursor and the co-catalyst precursor to a reactor heated to a predetermined temperature while preventing contact therebetween; and synthesizing an alloy catalyst in the reactor.

In accordance with a further aspect of the present invention, a method of preparing a non-platinum alloy catalyst for fuel cells includes: vaporizing at least two non-platinum (non-Pt) catalyst precursors in separate vaporizers; supplying the at least vaporized two non-platinum catalyst precursors to a reactor heated to a predetermined temperature while preventing contact therebetween; and synthesizing a non-platinum alloy catalyst in the reactor.

These methods for preparing alloy catalysts for fuel cells produce multi-alloy catalysts in a one-step reaction process, in which various metal catalyst precursors are vaporized and reacted with each other in a reactor.

In this way, by directly reacting the vaporized precursors to prepare alloy catalysts having various components, the present invention is capable of synthesizing and alloying nano-scale catalyst particles in a one-step process without multi-step preparation and post-treatment, unlike general multi-component metal catalysts.

In addition, by directly reacting the vaporized precursors, the present invention can prepare an alloy at a much lower temperature than typical methods for preparing an alloy, thereby achieving significant cost reduction.

Since the alloy catalyst particles prepared by the method according to the present invention are nano-scale particles which are much smaller than catalysts prepared by typical methods, the present invention has various effects, such as significant increase in the number of reaction activation sites, reduction in production costs through nano-crystallization, and improved durability of a metal catalyst through active interaction between the metal catalyst and a support, and the like.

The method of preparing an alloy catalyst for fuel cells may further include heat treatment of the synthesized alloy catalyst. Although it is possible to prepare an alloy having a desired composition through a one-step reaction process by adjusting temperature of the reactor and flow rate of the vaporized catalyst precursors, the prepared alloy may have excellent physical properties or structures by reacting the precursors at low temperature, followed by heat treatment of the precursors.

In some embodiments, a support for the catalyst may be placed in a reactor to support the catalyst on a support while synthesizing the alloy catalyst.

Furthermore, in order to prevent condensation or coagulation of the vaporized catalyst precursors, a transfer line between the vaporizer and the reactor may be as short as possible. Further, in order to prevent condensation or coagulation of the vaporized catalyst precursors, the transfer line may be heated to a temperature at which each catalyst precursor is vaporized.

In accordance with yet another aspect of the present invention, an alloy catalyst for fuel cells prepared by the method of the present invention is provided. The catalyst has a nano-scale. The fuel battery may include such an alloy catalyst for fuel cells.

As described above, the method of preparing an alloy catalyst for fuel cells according to the present invention can prepare an alloy catalyst in a one-step process unlike typical multi-step methods for preparing catalysts, and can prepare an alloy catalyst at a much lower temperature than the typical methods for preparing alloys, thereby enabling mass production and cost reduction.

Further, since the alloy catalyst particles prepared by the method according to the present invention are nano-scale particles and much smaller than catalysts prepared by typical methods in the art, the present invention has various effects, such as significant increase in the number of reaction activation sites, reduction in production costs through nano-crystallization, and improved durability of a metal catalyst through active interaction between the metal catalyst and a support, and the like.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
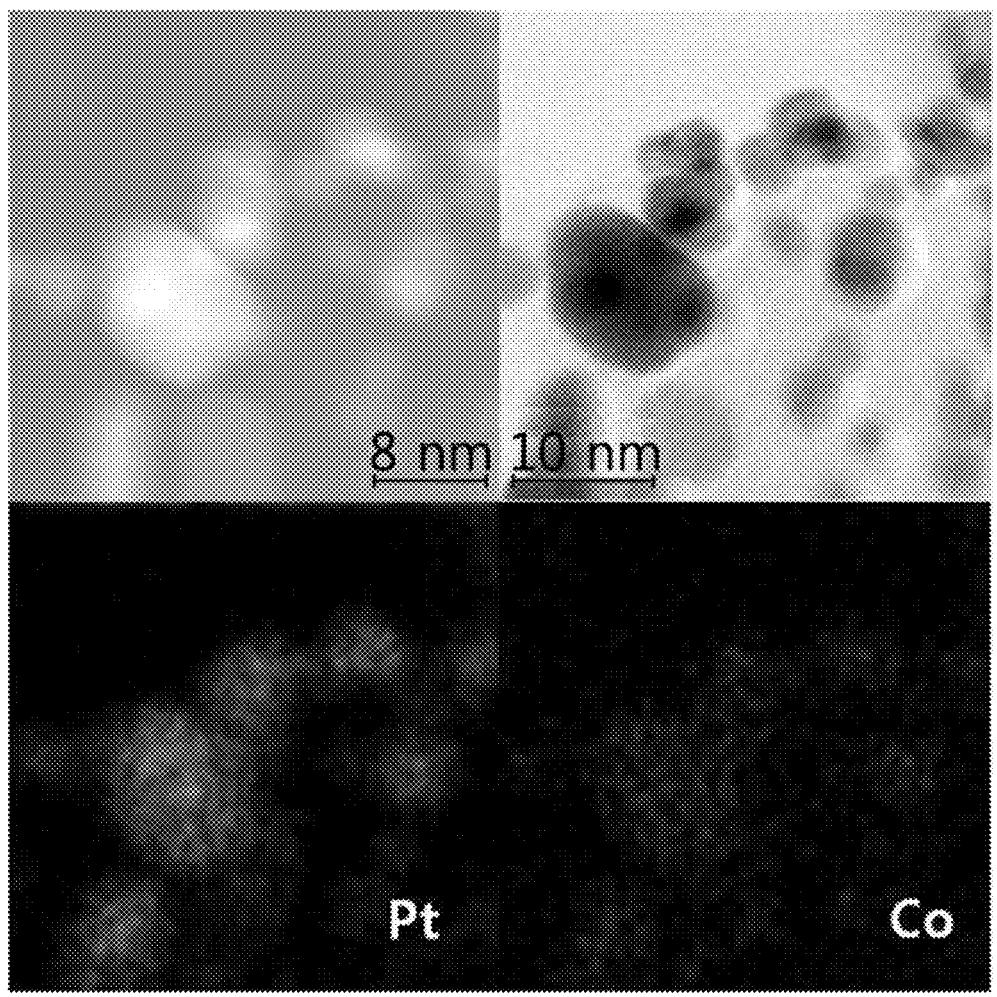
FIG. 1 shows TEM-mapping results of a platinum-cobalt alloy catalyst prepared in Example 1.

Hereinafter, a method of preparing an alloy catalyst for fuel cells according to one embodiment of the present invention will be described in detail.

First, at least two catalyst precursors are vaporized in separate vaporizers. The alloy catalyst prepared by the method according to the embodiment may include all alloy catalysts to be used in fuel cells. Particularly, examples of the alloy catalysts include platinum alloy catalysts prepared from platinum and a co-catalyst material, and a non-platinum (non-Pt) alloy catalysts prepared from non-platinum materials.

In preparation of a platinum alloy catalyst, any platinum compound capable of being vaporized may be employed as a platinum precursor. Typical examples of the platinum compounds may include trimethyl(methylcyclopentadienyl) platinum (IV), platinum (II) acetylacetonate, tetrakis(trifluorophosphine) platinum (0), tetrakis(triphenylphosphine) platinum (0), platinum (II) hexafluoroacetylacetonate, trimethyl(methylcyclopentadienyl) platinum (IV), (1,5-cyclooctadien)dimethyl platinum (II), and the like. Specifically, trimethyl(methylcyclopentadienyl) platinum (IV) ($C_5H_4CH_3Pt(CH_3)_3$), which has a low vaporization temperature of 50° C. to 70° C., is advantageous.

Generally, the co-catalyst material for the platinum alloy catalyst may be selected from elements of Groups 4A, 5A and 8B of the periodic table. Specifically, cobalt (Co), ruthenium (Ru), tin (Sn), molybdenum (Mo), copper (Cu), palladium (Pd) and the like may be used as the co-catalyst material. Particularly, two or three or more of these elements may be used in combination. For example, in order to enhance the reaction rate at a cathode at which oxygen reduction reaction occurs, a cobalt co-catalyst may be added to platinum. In order to enhance CO resistance at an anode, ruthenium may be added.

Among co-catalysts, cobalt (II) acetylacetonate, dicarbonyl cyclopentadienyl cobalt, cobalt carbonyl, and cyclopentadienyl dicarbonyl-cobalt (I), and the like may be used as a cobalt (Co) precursor. Specifically, since dicarbonyl cyclopentadienyl cobalt ($C_5H_5Co(CO)_2$) has a liquid phase at room temperature, it can be easily vaporized only by adjusting a carrier gas.

Among co-catalysts, ruthenium acetylacetonate, bis(ethylcyclopentadienyl) ruthenium (II), bis(cyclopentadienyl) ruthenium (II), tris(2,2,6,6-tetramethyl-3,5-heptanedionato) ruthenium (III), and the like may be used as a ruthenium precursor. Specifically, bis(cyclopentadienyl) ruthenium (II) ($C_{10}H_{10}Ru$) has a low vaporization temperature of 100° C. to 150° C.

As a vaporizer to vaporize the catalyst precursors, any vaporizers capable of vaporizing metal precursors may be employed. Generally, vaporizers made of metal, glass (quartz or Pyrex), and the like are used. Specifically, it is advantageous to use a vaporizer made of glass, which can maintain constant temperature, allows confirmation of properties and the remaining amount of the content therethrough, and is stable without causing any reaction with the precursors.

In order to maintain a constant flow rate of the vaporized catalyst precursors discharged from the vaporizers, a separate device for maintaining vapor pressure may be provided to each of the vaporizer such that the precursors of constant concentrations can be discharged from the vaporizers.

Next, the at least two precursors vaporized in the vaporizers are supplied to a reactor through separate transfer lines without contact therebetween. In order to supply the precursors vaporized in the vaporizers, a carrier gas may be flowed from the vaporizers to the reactor. The carrier gas may be an inert gas, such as nitrogen, helium, argon, or the like, which causes no reaction with the catalyst precursors.

The transfer lines through which the vaporized catalyst precursors are supplied from the vaporizers to the reactor are preferably as short as possible. Further, in order to prevent condensation or coagulation of the vaporized catalyst precursors due to temperature drop, a line heater may be provided to each of the transfer lines. The transfer lines may be heated to near a vaporization temperature of the catalyst precursors to be transferred.

In this way, since the vaporized catalyst precursors are supplied to the reactor through the separate transfer lines, it is possible to prevent side reaction at low temperature before each catalyst precursor arrives at the reactor. In addition, by controlling the flow rate of the carrier gas for transferring the vaporized catalyst precursors, it is possible to adjust the amount of the catalyst precursors supplied to the reactor.

Then, the vaporized catalyst precursors supplied through separate transfer lines are reacted in the reactor to form an alloy catalyst.

The vaporized catalyst precursors supplied through separate transfer lines are first brought into contact with each other in the reactor, which is preheated to a temperature at which the catalyst precursors are reacted to form the alloy catalyst, whereby the vaporized catalyst precursors can react with each other as soon as they arrive at the reactor.

Before preheating of the reactor to a reaction temperature, a support for the alloy catalyst may be placed inside the reactor such that the alloy catalyst formed by reaction can be directly supported on the support. Alternatively, the alloy catalyst prepared in the reactor may be supported on a support through a separate process. As the support for the alloy catalyst for fuel cells, carbon supports, such as carbon black, carbon nanowires (carbon nanotubes, carbon nanofibers, and the like), and the like may be used.

The present invention may employ various reactors depending on temperature at which the alloy catalyst is formed. Specifically, in the case of using a reactor made of quartz glass, the reactor temperature is preferably set in the range of 300° C. to 1100° C. Further, in the case of using a reactor made of an alumina tube or graphite, although the reactor temperature may be set to 1800° C., the reactor temperature may be set to 1800° C. or more by appropriately designing heating furnaces and reactors. Generally, the vaporized catalyst precursors are supplied to the reactor while the reactor temperature is maintained in the range of 500° C. to 1100° C. depending on the physical properties and structure of a desired alloy catalyst.

Further, the composition and physical properties of the alloy catalyst can be controlled by adjusting the reactor temperature and flow rate of each vaporized catalyst precursor supplied to the reactor.

Finally, the alloy catalyst synthesized in the reactor may be subjected to heat treatment, as needed. The alloy catalyst having a desired composition may be prepared by reaction between the catalyst precursors in the reactor. However, when there is a need for an alloy catalyst having excellent activity, the physical properties and structure of a multicomponent alloy catalyst comprised of at least two metal components may be adjusted through heat treatment of the alloy catalyst with reference to the phase diagram of the alloy.

Conventionally, in preparation of an alloy catalyst for fuel cells, a catalyst for a cathode is generally prepared by providing a platinum catalyst, followed by providing a precursor, such as cobalt, copper or palladium as a co-catalyst, and annealing of the platinum catalyst and the precursor to form an alloy. In addition, a catalyst for an anode is generally prepared by providing platinum, followed by providing a metal such as ruthenium, tin, molybdenum, and the like as a co-catalyst, and annealing of platinum and the co-catalyst to form an alloy. In this way, the typical method for preparing alloy catalysts for fuel cells requires sequentially providing the precursors, burning and annealing to form alloys. On the contrary, the method of preparing an alloy catalyst according to the present invention has a merit in that the method can be conducted in a one-step process without any separate treatment by forming a nano-scale alloy or a nano-scale metal hybrid in the course of synthesis without any separate alloying procedure.

Now, the present invention will be described in more detail with reference to some examples. It should be understood that these examples are provided for illustration only and that various modifications and changes can be made without departing from the spirit and scope of the invention. Therefore, it should be understood that such modifications and changes fall within the scope of the attached claims herein.

Example 1: Preparation of Platinum-Cobalt Alloy Nanoparticles for Cathode of Fuel Cell 1) A platinum precursor and a cobalt precursor were placed in vaporizers made of Pyrex. As the platinum precursor, trimethyl(methylcyclopentadienyl) platinum (IV) (Strem) was used. In order to avoid contact with air, the precursors were provided to the vaporizers within a glove box, and then placed in an oven. The vaporization temperature of the platinum precursor was maintained at 60° C., and nitrogen, which does not react with the precursors, was used as a carrier gas for transferring the vaporized precursors.

Dicarbonylcyclopentadienyl cobalt (Aldrich) was used as the cobalt precursor. Dicarbonylcyclopentadienyl cobalt has a liquid phase at room temperature and can be easily vaporized with the flow of the carrier gas. Since the cobalt precursor can be easily degenerated when brought into contact with atmosphere, the cobalt precursor was injected through a septum made of Teflon® disposed at one side of the vaporizer using a gas-tight syringe. Since the cobalt precursor can be easily vaporized at room temperature, the oven was maintained at 30° C., and the amount of cobalt precursor was adjusted by controlling the flow rate of nitrogen used as the carrier gas.

2) The catalyst precursors vaporized in the separate vaporizers were transferred to a reactor through separate transfer lines. In order to prevent the platinum precursor and the cobalt precursor from re-condensation or adsorption to inner walls of the transfer lines during transfer thereof, a line heater was used to heat the transfer lines, which extended from the oven for vaporization to a quartz reactor within a furnace for synthesis reaction, to the vaporization temperature of the catalyst precursors. Namely, the transfer line for the platinum precursor was maintained at 60° C., which was the same as the vaporization temperature for the platinum precursor, whereas the transfer line for the cobalt precursor was maintained at 30° C. The transfer lines were arranged such that the catalyst precursors were brought into contact with each other for the first time at an entrance of the quartz reactor, thereby preventing side reaction before arrival of each precursor at the reactor.

3) While the catalyst precursors were transferred through the separate transfer lines, respectively, the catalyst precursors were brought into contact with each other for the first time at the entrance of the quartz reactor placed in the furnace, which was heated to temperature for alloy catalyst production, thereby allowing reaction of the catalyst precursors upon arrival at the entrance. A filter or a membrane made of quartz or metal was placed in the middle of the quartz reactor manufactured in a tube shape to collect synthesized metal hybrid nanoparticles. The filter or membrane was provided with a thermometer to control the synthesis temperature. The ratio of the catalyst precursors for synthesis of platinum-cobalt alloy catalyst particles was adjusted in the range of 3:1 to 10:1. The temperature of the reactor for synthesizing platinum-cobalt alloy catalyst particles was controlled in the range of 60° C. to 300° C.

4) Thereafter, in order to form an alloy, the platinum-cobalt alloy catalyst particles were subjected to heat treatment by adjusting the reactor temperature in the range of 400° C. to 800° C.

The physical properties and crystallinity of the metal particles synthesized at each composition and heat treatment temperature were analyzed using transmission electron microscopy (TEM) and X-ray diffraction (XRD). Results are summarized in Experimental Examples.

Example 2: Preparation of Platinum-Ruthenium Alloy Nanoparticles for Anode of Fuel Cell 1) A platinum precursor and a ruthenium precursor were placed in vaporizers made of Pyrex. As the platinum precursor, trimethyl(methylcyclopentadienyl) platinum (IV) (Strem) was used. The vaporization temperature of the platinum precursor was maintained at 60° C., and nitrogen was used as a carrier gas for transferring the vaporized precursors. As the ruthenium precursor added to enhance CO resistance at an anode, bis(cyclopentadienyl) ruthenium (II) (Aldrich) was used. In order to vaporize the ruthenium precursor, an oven in which the vaporizers were placed was maintained at 150° C., and the amount of ruthenium introduced to the reactor was adjusted by supplying the carrier gas.

2) The catalyst precursors vaporized in the separate vaporizers were transferred to a reactor through separate transfer lines. In order to prevent the platinum precursor and the ruthenium precursor from re-condensation or adsorption to inner walls of the transfer lines during transfer thereof, the precursors were removed from the oven and a line heater was used to heat the transfer lines, which extended from the oven for vaporization to a quartz reactor within a furnace for synthesis reaction, to the vaporization temperature of the catalyst precursors. Namely, the transfer line for the platinum precursor was maintained at 60° C., which was the same as the vaporization temperature for the platinum precursor, whereas the transfer line for the ruthenium precursor was maintained at 150° C. The transfer lines were arranged such that the catalyst precursors were brought into contact with each other for the first time at an entrance of the quartz reactor where the synthesis reaction occurs, thereby preventing side reaction before arrival of each precursor at the reactor.

3) While the catalyst precursors were transferred through the separate transfer lines, respectively, the catalyst precursors were brought into contact with each other for the first time at the entrance of the quartz reactor placed in the furnace, which was heated to temperature for alloy catalyst production, thereby allowing reaction of the catalyst precursors upon arrival at the entrance. A filter or a membrane made of quartz or metal was placed in the middle of the quartz reactor manufactured in a tube shape to collect synthesized metal hybrid nanoparticles. The filter or membrane was provided with a thermometer to control the synthesis temperature. The ratio of the catalyst precursors for the synthesis of platinum-ruthenium alloy catalyst particles was adjusted in the range of 3:1 to 10:1. The temperature of the reactor for synthesizing platinum-ruthenium nanoparticles was controlled to 150° C. to 300° C.

4) Thereafter, in order to form an alloy, the platinum-ruthenium nanoparticles were subjected to heat treatment by adjusting the reactor temperature in the range of 400° C. to 800° C.

Experimental Example 1: XRD Analysis of Platinum-Cobalt Alloy Catalyst Particles Platinum-cobalt alloy catalyst particles prepared in the same manner as in Example 1 except that the heat treatment temperature was changed were subjected to XRD analysis. As a result, it could be seen that these platinum-cobalt alloy catalyst particles formed alloys at a relatively low temperature (about 600° C.), as compared with CoPt/C catalyst prepared by impregnation (after impregnation, subjected to annealing at 800° C. as a separate process). The same results could be identified from the presence of Pt—Co alloy peaks in the catalyst as prepared in Examples wherein the platinum precursor and the cobalt precursor were vaporized at the same time, followed by supporting the nanoparticles on a carbon support, and heat treatment at 600° C. for alloying.

Experimental Example 2: TEM Analysis for Composition of Platinum-Cobalt Alloy Catalyst Particles Platinum-cobalt alloy catalyst particles prepared in the same manner as in Example 1 except that the heat treatment temperature was set to 600° C. were subjected to TEM analysis. Results are shown in FIG. 1. In FIG. 1, it could be seen that the mapping results for the Pt component and Co component were similar as a result of effective alloying of the platinum particles and cobalt particles.

Figure 2:
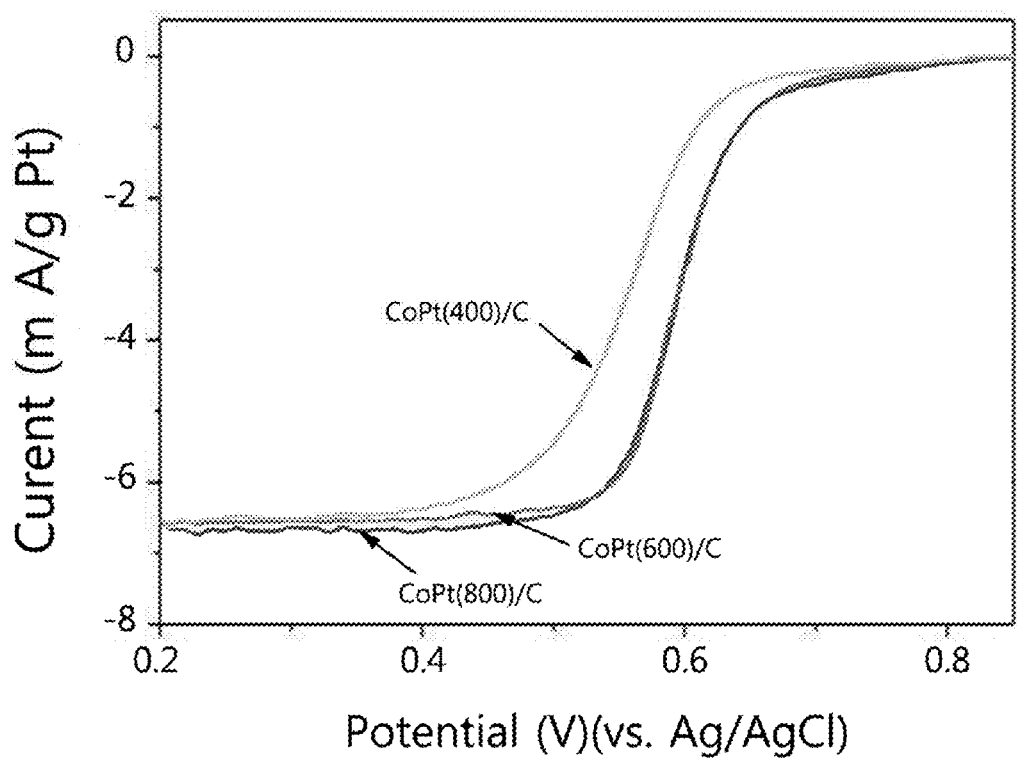
FIG. 2 shows results of oxygen reduction reaction of a platinum-cobalt alloy catalyst prepared in Example 1.

Experimental Example 3: Comparison of Oxygen Deduction Reaction (ORR) Activity of Platinum-Cobalt Alloy Catalyst Particles Platinum-cobalt alloy catalyst particles prepared in the same manner as in Example 1 were subjected to oxygen reduction reaction. Results are shown in FIG. 2. The oxygen reduction reaction was measured using 0.5M aqueous sulfuric acid solution at 25° C. in oxygen atmosphere, wherein the potential scan rate was set to 50 mV/s. Conclusively, it could be seen that, when the platinum-cobalt alloy catalyst particles prepared in the same manner as in Example 1 were subjected to alloying through heat treatment at 600° C., the resultant alloy catalyst showed a degree of alloying very similar to that of the alloy catalyst formed by heat treatment at 800° C. or more, thereby showing similar oxygen reduction reaction activity. Namely, in FIG. 2, it could be seen that the platinum-cobalt alloy catalyst subjected to heat treatment at 400° C. (CoPt(400)/C) had the lowest reaction activity, whereas the platinum-cobalt alloy catalyst subjected to heat treatment at 600° C. (CoPt(600)/C) showed oxygen reduction reaction activity similar to that of the platinum-cobalt alloy catalyst subjected to heat treatment at 800° C. (CoPt(800)/C). From the results, it could be seen that the alloy catalyst prepared in the same manner as in Example 1 wherein multi-component precursors were vaporized at the same time could be effectively prepared at a much lower temperature than the alloy catalyst prepared by typical impregnation.

Although some embodiments have been provided to illustrate the present invention, it should be understood that these embodiments are given by way of illustration only, and that various modifications, variations, and alterations can be made without departing from the spirit and scope of the present invention. The scope of the present invention should be limited only by the accompanying claims and equivalents thereof.

What is claimed is:
1. A method of preparing an alloy catalyst for fuel cells, comprising:
vaporizing at least two catalyst precursors in separate vaporizers wherein each of the separate vaporizers is placed in an oven which is maintained at a vaporization temperature of the respective catalyst precursor of the at least two catalyst precursors;

supplying the at least two vaporized catalyst precursors to a reactor through separate transfer lines while preventing contact therebetween, wherein the transfer lines are maintained in a vaporization temperature range of each of the catalyst precursors by line heaters; and synthesizing an alloy catalyst within the reactor wherein the at least two vaporized precursors react with each other to form the alloy catalyst within the reactor, wherein the at least two precursors are a platinum (Pt) catalyst precursor and at least one co-catalyst precursor.

2. The method according to claim 1, further comprising: performing heat treatment of the synthesized alloy catalyst.

3. The method according to claim 1, further comprising: placing a support for the catalyst in the reactor before supplying the at least two vaporized catalyst precursors to the reactor.

4. The method according to claim 1, wherein, upon supplying the at least two vaporized catalyst precursors to the reactor, the reactor is preheated to a predetermined temperature for reacting the at least two vaporized catalyst precursors.

5. The method according to claim 1, wherein the platinum (Pt) catalyst precursor comprises at least one selected from the group consisting of trimethyl(methylcyclopentadienyl) platinum (IV), platinum (II) acetylacetonate, tetrakis(trifluorophosphine) platinum (0), tetrakis(triphenylphosphine) platinum (0), platinum (II) hexafluoroacetylacetonate, and (1,5-cyclooctadien)dimethyl platinum (II).

6. The method according to claim 1, wherein the co-catalyst precursor comprises at least one selected from elements of Groups 4A, 5A and 8B of the periodic table.

7. The method according to claim 1, wherein the co-catalyst precursor comprises a cobalt (Co) precursor, the cobalt (Co) precursor comprising at least one selected from cobalt (II) acetylacetonate, dicarbonyl cyclopentadienyl cobalt, cobalt carbonyl, and cyclopentadienyl dicarbonyl-cobalt (I).

8. The method according to claim 1, wherein the co-catalyst precursor comprises a ruthenium (Ru) precursor, the ruthenium (Ru) precursor comprising at least one selected from ruthenium acetylacetonate, bis(ethylcyclopentadienyl) ruthenium (II), bis(cyclopentadienyl) ruthenium (II), and tris(2,2,6,6-tetramethyl-3,5-heptanedionato) ruthenium (III).

* * * * *